United States Patent
Xu et al.

(10) Patent No.: US 12,435,340 B2
(45) Date of Patent: Oct. 7, 2025

(54) METHODS FOR TRANSFORMATION OF DICOT PLANT CELLS

(71) Applicant: SYNGENTA CROP PROTECTION AG, Basel (CH)

(72) Inventors: Jianping Xu, Beijing (CN); Chao Li, Beijing (CN); Qin Wen, Beijing (CN)

(73) Assignee: Syngenta Crop Protection AG, Basel (CH)

( * ) Notice: Subject to any disclaimer, the term of this patent is extended or adjusted under 35 U.S.C. 154(b) by 0 days.

(21) Appl. No.: 17/640,099

(22) PCT Filed: Aug. 28, 2020

(86) PCT No.: PCT/US2020/048308
§ 371 (c)(1),
(2) Date: Mar. 3, 2022

(87) PCT Pub. No.: WO2021/045960
PCT Pub. Date: Mar. 11, 2021

(65) Prior Publication Data
US 2022/0290168 A1   Sep. 15, 2022

(30) Foreign Application Priority Data
Sep. 4, 2019 (WO) ............... PCT/CN2019/104384

(51) Int. Cl.
C12N 15/82   (2006.01)

(52) U.S. Cl.
CPC ..... *C12N 15/8205* (2013.01); *C12N 15/8207* (2013.01)

(58) Field of Classification Search
None
See application file for complete search history.

(56) References Cited

U.S. PATENT DOCUMENTS

| | | | |
|---|---|---|---|
| 7,473,822 B1 | 1/2009 | Paz et al. | |
| 8,481,319 B2 | 7/2013 | Dan et al. | |
| 2002/0073445 A1 | 6/2002 | Zhong et al. | |
| 2014/0173774 A1* | 6/2014 | Pareddy | C12N 15/8274 |
| | | | 800/278 |

FOREIGN PATENT DOCUMENTS

| | | |
|---|---|---|
| CN | 87104202 A | 3/1988 |
| CN | 1280622 A | 1/2001 |
| CN | 1338001 A | 2/2002 |
| CN | 1515671 A | 7/2004 |
| CN | 1519324 A | 8/2004 |
| CN | 104869809 A | 8/2015 |
| CN | 104988177 A | 10/2015 |
| CN | 108040876 A | 5/2018 |
| CN | 111560398 | 8/2020 |

OTHER PUBLICATIONS

Miles DF, TeKrony DM and Egli DB. 1988, 28(4): 700-704.*
Ahn JH and Lee JS. 2003. Plant Cell Rep. 22:286-293.*
Singh et al. Plant Physiology, Apr. 2002, 128:1480-1489.*
Kim et al 2004, Plant Cell, Tissue and Organ Culture, 78:107-111.*
Angulo-Bejarano et al., , 3 Biotech, 2019, 9:98. https://doi.org/10.1007/s13205-019-1627-6.*
Janssen et al. 1989. Plant Molecular Biology, 14:61-72.*
Guo, M., et al. "Optimization of factors affecting Agrobacterium-mediated transformation of Micro-Tom tomatoes." Genet. Mol. Res 11.1 (2012): 661-671. (Year: 2012).*
Sigareva, Marina, et al. "An efficient mannose selection protocol for tomato that has no adverse effect on the ploidy level of transgenic plants." Plant Cell Reports 23.4 (2004): 236-245. (Year: 2004).*
Frary, et al. "An examination of factors affecting the efficiency of Agrobacterium-mediated transformation of tomato." Plant cell reports 16 (1996): 235-240. (Year: 1996).*
International Search Report for International Application No. PCT/US2020/048308 mailed Dec. 8, 2020.
Bubner et al., "Occurrence of Tetraploidy in Nicotiana Attenuata Plants After Agrobacterium-Mediated Transformation is Genotype Specific but Independent of Polysomaty of Explant Tissue," Plant Cell Reports, Mar. 4, 2006, vol. 25, Issue 7, pp. 668-675.
Harold N Trick et al: "Recent advances in soybean transformation", Plant Tissue Culture & Biotech., vol. 3, pp. 9-26, Mar. 1, 1997.
Extended European Search Report for EP Application No. 20861786.0, mailed 09Aug2023.

* cited by examiner

*Primary Examiner* — Charles Logsdon
(74) *Attorney, Agent, or Firm* — Dale Skalla

(57) ABSTRACT

This disclosure relates to methods of transformation of dicots, such as tomato and watermelon. In some aspects, the methods comprise use of dicot explants obtained by dividing seeds and soaking the dicot explants in various media. In some aspects, transformed cells of a dicot plant are provided as well as dicot plants comprising transformed cells.

16 Claims, No Drawings

METHODS FOR TRANSFORMATION OF DICOT PLANT CELLS

RELATED APPLICATIONS

This is a 371 application of International application No. PCT/US2020/048308, filed Aug. 28, 2020, which claims priority to International application No. PCT/CN2019/104384 filed, Sep. 4, 2019, the contents of which are incorporated herein by reference.

FIELD OF THE INVENTION

The present invention relates generally to the field of plant biotechnology. More specifically, the present invention relates to methods for improving transformation in dicot plants, such as improving transformation frequency and/or reducing polyploidy events in dicot plants.

BACKGROUND

Tomato (*Solanum lycopersicum* L.) is the second-most important vegetable crop after potato. Consuming tomato is thought to contribute significantly to human health and nutrition since tomato is a rich source of minerals, vitamins, and lycopene and (3-carotene pigments.

The transformation system of tomato was established in the 1980s, and various transformation systems have been reported since then. In most of the transformation systems, cotyledon or hypocotyl from 6 to 8-day old seedlings are used as explants. Though there are reports in which leaves from 4 to 6-week old plants are used as explants, the culture conditions and medium may be different than the culture conditions and medium for cotyledon or hypocotyl and may need more optimization before applying to different varieties.

A major challenge of tomato transformation using cotyledon and hypocotyl as explants is large percentage of transgenic events with abnormal ploidy chromosome (Ellul et al. 2003), it is shown 30%-80% of the transgenic events with abnormal ploidy when using cotyledon as explants in 3 varieties (Sigareva et al. 2004). The percentage of diploid plants in transgenics and tissue culture regenerated non-transgenics were 63%-78% from cotyledon with petiole, 22%-58% from hypocotyl, and 90%-100% from leaf explants through tissue culture, though the leaf explants from many genotypes were the least regenerable.

Polyploidy events are usually sterile and phenotypically normal and are indistinguishable from diploid events at early stages. As a result, there is a need for methods of reducing the proportion of polyploidy events to make transformation more efficient and high throughput.

SUMMARY OF THE INVENTION

The disclosure provides improved methods of transforming dicots, such as tomatoes and watermelon. As described herein, methods were developed that increased the transformation efficiency in dicots such as tomato and watermelon. In some embodiments, the methods resulted in transformation frequencies of between about 2-30% in tomato and about 70% in watermelon. In some embodiments, the methods described herein result in improved transformation efficiency, reduced aneuploidy in transformed plants, capability for high-throughput output, lower cost, a faster transformation process, and/or genotype-independent transformation.

Accordingly, in some aspects, the disclosure provides a method of transforming a dicot plant cell, comprising: (a) obtaining a dicot plant seed (e.g., a mature tomato seed or a mature watermelon seed); soaking the dicot plant seed in a suitable seed-soak medium; (b) dividing the soaked dicot plant seed of step (b) into a plurality of dicot explants; inoculating the plurality of dicot explants of step (c) with *Agrobacterium* comprising a nucleic acid of interest, thereby obtaining *Agrobacterium*-inoculated dicot explants; and (e) co-cultivating the *Agrobacterium*-inoculated dicot explants to produce a transformed dicot plant cell. In other aspects, the disclosure provides a method of transforming a dicot plant cell, comprising: (a) obtaining a dicot plant seed (e.g., a mature tomato seed or a mature watermelon seed); (b) soaking the dicot plant seed in a suitable seed-soak medium; (c) dividing the soaked dicot plant seed of step (b) into a plurality of dicot explants; and (d) delivering a nucleic acid of interest into the plurality of dicot explants using a biolistic particle deliver system to produce a transformed dicot plant cell.

In some embodiments, the dicot plant seed is a mature seed. In some embodiments, the dicot plant seed is a dry mature seed. In some embodiments, the dicot plant seed is a fresh seed harvested from fresh fruit or a vigorous seed harvested from a dried fruit. In some embodiments, the dicot plant seed is a fresh maturing seed harvested from fresh fruit or a vigorous maturing seed harvested from a dried fruit.

In some embodiments, the co-cultivation of step (e) occurs in darkness over a multi-day period (e.g., at least 1, 2, 3, 4, 5, 6, 7 or more days). In some embodiments, the multi-day period is 1 to 5 days, and preferably 2 days, at a temperature of approximately 22 degrees Celsius, such as between 21-23 degrees Celsius.

In some embodiments, the method further comprises (f) removing the dicot explants from the co-culture of step (e) or the delivery of step (d) and allowing said explants to recover; and (g) incubating the recovered dicot explants from step (f) on at least one selection medium, wherein the at least one selection medium permits survival of transformed dicot explants. In some embodiments, the selection medium is a selection medium described in the Examples or containing about the same components as a selection medium described in the Examples. In some embodiments, the recovering step of step (f) occurs in darkness over an at least one day period (e.g., one to seven days) in a recovery medium at approximately 25° C., optionally wherein the recovery medium comprises MS salts and vitamins, 0.01 mg/L IAA, 1 mg/L Zeatin, 150 mg/L timentin, and 150 mg/L carbenicillin. In some embodiments, the recovery medium is a recovery medium described in the Examples or containing about the same components as a recovery medium described in the Examples.

In some embodiments, the method further comprises placing the selected transformed dicot explants of step (g) onto growth medium. In some embodiments, the growth medium is a growth medium described in the Examples or containing about the same components as a growth medium described in the Examples.

In some embodiments, the suitable seed-soak medium comprises a medium selected from the group consisting of water, B5, Woody, and MS. In some embodiments, the seed-soak medium is a germination medium described in the Examples or containing about the same components as a germination medium described in the Examples.

In some embodiments, a seed coat of the dicot plant seed is removed or damaged before the inoculation or delivery of step (d). In some embodiments, the seed coat is removed or damaged by a manual means or a mechanical means.

In some embodiments, the soaking step of step (b) is within the range of approximately 1 hour to approximately 72 hours, with or without light.

In some embodiments, the method further comprises growing the selected transformed dicot explants into seedlings, and optionally sampling said seedlings for molecular analysis (e.g., to detect incorporation of the nucleic acid of interest into cells of the seedling such as by TaqMan assay or next generation sequencing).

In some embodiments, the dividing in step (c) comprises cutting or crushing the soaked dicot plant seed of step (b).

In some embodiments, the cutting or crushing in step (c) comprises use of a razor blade, a scalpel, a blender, a burr grinder, a press, a series of blades, a mortar and pestle, a microtome, a knife, or a combination thereof, including a machine comprising any one or more of the preceding.

In some embodiments, the transformed dicot plant cell is selected from the group consisting of a tomato cell, a watermelon cell, a spinach cell, a soybean cell, a peanut cell, a sunflower cell, a *Brassica* species cell, a Cucurbit species cell, an alfalfa cell, a thale cress (*Arabidopsis*) cell, and a Solanaceae species cell. In some embodiments, the transformed dicot plant cell is the transformed dicot plant cell a tomato cell or a watermelon cell.

In some embodiments, the plurality of dicot explants is at least 2, 3, or more discrete explants, such as 2, 3, 4, 5, 6, 7, 8, 9, 10, 11, 12, 13, 14, 15, 16, 17, 18, 19, 20 or more discrete explants, but preferably 10, 11, 12, 13, 14, 15, 16, 17, 18, 19, or 20 discrete explants. In some embodiments, the plurality of dicot explants is 14, 15, 16, 17, or 18 discrete explants.

In some embodiments, the discrete explants are approximately 0.2 mm-8.0 mm in size.

In some embodiments, the at least one selection medium comprises an antibiotic selection agent, a metabolic selection agent, or herbicide selection agent. In some embodiments, the selection agent is glyphosate, glufosinate, spectinomycin, or kanamycin. In some embodiments, the antibiotic selection agent is selected from the group consisting of spectinomycin, kanamycin, ampicillin, streptomycin, tetracycline, and the like. In some embodiments, the metabolic selection agent is a non-metabolizable sugar. In some embodiments, the herbicide selection agent is glyphosate, glufosinate, bialaphose, ALS, phosphinothricin (PPT). In some embodiments, the non-metabolizable sugar is selected from the group consisting of mannose-6-phosphate, palatinose, and turanose.

In some embodiments, the method produces fewer aberrant tetraploid transformants (e.g., less than 15%, less than 10%, less than 5%, less than 1% aberrant tetraploid transformants). In some embodiments, the method results in a transformation frequency of at least 2% (e.g., between about 2-30%).

In other aspects, the disclosure provides a method comprising some or all of the steps of a process described any of the Examples.

In other aspects, the disclosure provides a transformed dicot plant cell produced or obtainable by any of the methods described herein.

In other aspects, the disclosure provides a seedling produced or obtainable by any of the methods described herein.

In other aspects, the disclosure provides a plant produced or obtainable by any of the methods described herein.

In other aspects, the disclosure provides a commodity product derived from a plant, seed, or parts thereof, of the disclosure. In some embodiments, the commodity product is selected from the group consisting of whole or processed seeds, fruits, sugars, protein isolates, juices, concentrates, liquids, syrups, pastes, sauces or other food or product produced from plants.

In other aspects, the disclosure provides a method comprising, (a) growing a seedling produced or obtainable by any of the methods described herein into a plant comprising transformed cells; and (b) crossing the plant comprising transformed cells with another plant to produce a progeny plant, optionally wherein the another plant does not comprise transformed cells. In other aspects, the disclosure provides a progeny plant produced by the method.

In other aspects, the disclosure provides a method of regenerating a dicot plant, comprising: (a) obtaining a dicot plant seed; (b) imbibing the dicot plant seed in a suitable imbibition medium; (c) dividing the whole imbibed dicot plant seed of step (b) to create a plurality of dicot plant explants; (d) incubating the plurality of dicot explants from step (c) on regeneration medium, wherein the regeneration medium allows survival of dicot explants. In some embodiments, the dicot plant seed is a mature dicot plant seed. In some embodiments, the method comprises one or more of the steps of a process described any of the Examples.

Definitions

Although the following terms are believed to be well understood by one of ordinary skill in the art, the following definitions are set forth to facilitate understanding of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art.

All patents, patent publications, non-patent publications referenced herein are incorporated by reference in their entireties for the teachings relevant to the sentence or paragraph in which the reference is presented. In case of a conflict in terminology, the present specification is controlling.

As used herein, the terms "a" or "an" or "the" may refer to one or more than one, unless the context clearly and unequivocally indicates otherwise. For example, "an" endogenous nucleic acid can mean one endogenous nucleic acid or a plurality of endogenous nucleic acids.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent, preferably 10 percent up or down (higher or lower). With regard to a temperature the term "about" means±1° C., preferably ±0.5° C. Where the term "about" is used in the context of this invention (e.g., in combinations with temperature or molecular weight values) the exact value (i.e., without "about") is preferred.

"Explant," as used herein, refers to tissue, a piece of tissue, or pieces of tissue derived from a plant or a plant part, such as a seed. An explant can be a part of a plant, such as immature embryos, leaves meristems, or can be derived from a portion of the shoot, leaves, immature embryos or any other tissue of a plant or seed.

The term "mature seed", as used herein, means a seed that is at a developmental stage that the seed can germinate without additional aid in soil. In some embodiments, a "mature seed" is a seed that is at least 14 days post pollination.

The terms "nucleic acid" or "polynucleotide" are used interchangeably herein and refer to any physical string of monomer units that can be corresponded to a string of nucleotides, including a polymer of nucleotides (e.g., a typical DNA polymer or polydeoxyribonucleotide or RNA polymer or polyribonucleotide), modified oligonucleotides (e.g., oligonucleotides comprising bases that are not typical to biological RNA or DNA, such as 2'-O-methylated oligonucleotides), and the like. In some embodiments, a nucleic acid or polynucleotide can be single-stranded, double-stranded, multi-stranded, or combinations thereof. Unless otherwise indicated, a particular nucleic acid or polynucleotide of the present invention optionally comprises or encodes complementary polynucleotides, in addition to any polynucleotide explicitly indicated. The nucleic acid can be present in a vector, such as in a cell, virus or plasmid.

The term "plant" refers to any plant, particularly to agronomically useful plants (e.g. seed plants), and "plant cell" is a structural and physiological unit of the plant, which comprises a cell wall but may also refer to a protoplast. The plant cell may be in form of an isolated single cell or a cultured cell, or as a part of higher organized units such as for example, a plant tissue, or a plant organ differentiated into a structure that is present at any stage of a plant's development. A plant may be a monocotyledonous or dicotyledonous plant species.

The term "plant part" indicates a part of a plant, including single cells and cell tissues such as plant cells that are intact in plants, cell clumps and tissue cultures from which plants can be regenerated. Examples of plant parts include, but are not limited to, single cells and tissues from pollen, ovules, leaves, embryos, roots, root tips, anthers, flowers, fruits, stems, shoots, and seeds; as well as pollen, ovules, leaves, embryos, roots, root tips, anthers, flowers, fruits, stems, shoots, scions, rootstocks, seeds, protoplasts, calli, and the like. The term "plant part" also includes explants.

The term "progeny" refers to the descendant(s) of a particular cross. Typically, progeny result from breeding of two individuals, although some species (particularly some plants and hermaphroditic animals) can be selfed (i.e., the same plant acts as the donor of both male and female gametes). The descendant(s) can be, for example, of the F1, the F2, or any subsequent generation.

The term "transformation" as used herein refers to the transfer of a nucleic acid into a host cell, preferably resulting in genetically stable integration, which includes integration into a chromosome and heritable extrachromosomal events. In some particular embodiments, the introduction into a plant, plant part and/or plant cell is via bacterial-mediated transformation, particle bombardment transformation (also called biolistic particle transformation), calcium-phosphate-mediated transformation, cyclodextrin-mediated transformation, electroporation, liposome-mediated transformation, nanoparticle-mediated transformation, polymer-mediated transformation, virus-mediated nucleic acid delivery, whisker-mediated nucleic acid delivery, microinjection, sonication, infiltration, polyethylene glycol-mediated transformation, protoplast transformation, or any other electrical, chemical, physical and/or biological mechanism that results in the introduction of a nucleic acid into the plant, plant part and/or cell thereof, or a combination thereof. General guides to various plant transformation methods known in the art include Miki et al. ("Procedures for Introducing Foreign DNA into Plants" in *Methods in Plant Molecular Biology and Biotechnology*, Glick, B. R. and Thompson, J. E., Eds. (CRC Press, Inc., Boca Raton, 1993), pages 67-88) and Rakowoczy-Trojanowska (2002, Cell Mol Biol Lett 7:849-858 (2002)).

By "stably introducing" or "stably introduced" in the context of a polynucleotide introduced into a cell is intended the introduced polynucleotide is stably incorporated into the genome of the cell, and thus the cell is stably transformed with the polynucleotide.

"Stable transformation" or "stably transformed" as used herein means that a nucleic acid is introduced into a cell and integrates into the genome of the cell. As such, the integrated nucleic acid is capable of being inherited by the progeny thereof, more particularly, by the progeny of multiple successive generations. "Genome" as used herein also includes the nuclear, mitochondrial and the plastid genome, and therefore includes integration of the nucleic acid into, for example, the chloroplast genome. Stable transformation as used herein can also refer to a transgene that is maintained extrachromasomally, for example, as a minichromosome.

A "selectable marker" or "selectable marker gene" refers to a gene whose expression in a plant cell gives the cell a selective advantage. "Positive selection" refers to a transformed cell acquiring the ability to metabolize a substrate that it previously could not use or could not use efficiently, typically by being transformed with and expressing a positive selectable marker gene. This transformed cell thereby grows out of the mass of nontransformed tissue. Positive selection can be of many types from inactive forms of plant growth regulators that are then converted to active forms by the transferred enzyme to alternative carbohydrate sources that are not utilized efficiently by the nontransformed cells, for example mannose, which then become available upon transformation with an enzyme, for example phosphomannose isomerase, that allows them to be metabolized. Non-transformed cells either grow slowly in comparison to transformed cells or not at all. Other types of selection may be due to the cells transformed with the selectable marker gene gaining the ability to grow in presence of a negative selection agent, such as an antibiotic or an herbicide, compared to the ability to grow of non-transformed cells. A selective advantage possessed by a transformed cell may also be due to the loss of a previously possessed gene in what is called "negative selection". In this, a compound is added that is toxic only to cells that did not lose a specific gene (a negative selectable marker gene) present in the parent cell (typically a transgene).

A "transgenic plant" is a plant having one or more plant cells that contain a heterologous DNA sequence.

DETAILED DESCRIPTION

The disclosure relates to methods of transformation of dicot plants and plant cells, such as tomato and watermelon plants and plant cells. In some embodiments, the methods described herein result in improved transformation efficiency, reduced aneuploidy in transformed plants, capability for high-throughput output, lower cost, a faster transformation process, and/or genotype-independent transformation.

In some embodiments, the method of transforming a dicot plant or plant cell comprises one or more steps as described herein, e.g., one or more steps described in the Examples, such one or more or all of the steps in any of Examples 1-9.

In some embodiments, the method of transforming a dicot plant or plant cell comprises obtaining a dicot plant seed; soaking the dicot plant seed in a suitable seed-soak medium; dividing the soaked dicot plant seed into a plurality of dicot explants; and introducing into at least some of the plurality of dicot explants a nucleic acid of interest. In some embodiments, the dicot plant seed is a mature dicot plant seed. The dividing can be into equal-sized explants or into unequal-sized explants. In some embodiments, the explants are of about the same size. In some embodiments, the suitable seed-soak medium is selected from the group consisting of water, B5, Woody, and MS. B5, Woody, and MS can be obtained from any source known in the art, such as from PhytoTechnology Laboratories (e.g., Cat Nos. M524, G398+ G219, or L449).

In some embodiments, the introducing into at least some of the plurality of dicot explants is via bacterial-mediated transformation (e.g., *Agrobacterium* transformation), particle bombardment transformation, calcium-phosphate-mediated transformation, cyclodextrin-mediated transformation, electroporation, liposome-mediated transformation, nanoparticle-mediated transformation, polymer-mediated transformation, virus-mediated nucleic acid delivery, whisker-mediated nucleic acid delivery, microinjection, sonication, infiltration, polyethyleneglycol-mediated transformation, any other electrical, chemical, physical and/or biological mechanism that results in the introduction of nucleic acid into at least some of the plurality of dicot explants, or a combination of any of the foregoing means. Preferably, the introducing into at least some of the plurality of dicot explants is via bacterial-mediated transformation (e.g., *Agrobacterium* transformation) or particle bombardment transformation.

*Agrobacterium*-mediated transformation is a commonly used method for transforming plants because of its relatively high efficiency and increased throughput of transformation and because of its broad utility with many different species. *Agrobacterium*-mediated transformation typically involves transfer of a binary vector carrying the foreign DNA of interest to an appropriate *Agrobacterium* strain that may depend on the complement of vir genes carried by the host *Agrobacterium* strain either on a co-resident Ti plasmid or chromosomally (see, e.g., Uknes et al 1993, Plant Cell 5:159-169). The transfer of the recombinant binary vector to *Agrobacterium* can be accomplished, e.g., by a tri-parental mating procedure using *Escherichia coli* carrying the recombinant binary vector, a helper *E. coli* strain that carries a plasmid that is able to mobilize the recombinant binary vector to the target *Agrobacterium* strain. Alternatively, the recombinant binary vector can be transferred to *Agrobacterium* by nucleic acid transformation (see, e.g., Höfgen and Willmitzer 1988, Nucleic Acids Res 16:9877).

Transformation of a plant by recombinant *Agrobacterium* usually involves co-cultivation of the *Agrobacterium* with explants from the plant. Transformed tissue is typically regenerated on selection medium carrying an antibiotic or herbicide resistance marker between the binary plasmid T-DNA borders. In some embodiments, the co-cultivation comprises one or more of the steps described in the Examples, such one or more of the steps in any of Examples 1-9.

Another method for transforming plants, plant parts and plant cells involves propelling inert or biologically active particles at plant tissues and cells, also referred to as biolistic particle bombardment. See, e.g., U.S. Pat. Nos. 4,945,050; 5,036,006 and 5,100,792. Generally, this method involves propelling inert or biologically active particles at the plant cells under conditions effective to penetrate the outer surface of the cell and afford incorporation within the interior thereof. When inert particles are utilized, the vector can be introduced into the cell by coating the particles with the vector containing the nucleic acid of interest. Alternatively, a cell or cells can be surrounded by the vector so that the vector is carried into the cell by the wake of the particle. Biologically active particles (e.g., dried yeast cells, dried bacterium or a bacteriophage, each containing one or more nucleic acids sought to be introduced) also can be propelled into plant tissue.

In some embodiments, plants, plant parts and plant cells transformed with a nucleic acid of interest can be selected, e.g., using selectable markers present in the nucleic acid of interest. In some embodiments, the plants, plant parts and plant cells transformed with a nucleic acid of interest are selected using one or more selection steps described in the Examples. In some embodiments, the selectable marker is a selectable marker used in one or more of the Examples, such one or more of the selectable markers in any of Examples 1-9.

Examples of selectable markers include, but are not limited to, genes that provide resistance or tolerance to antibiotics such as kanamycin (Dekeyser et al. 1989, Plant Phys 90: 217-23), spectinomycin (Svab and Maliga 1993, Plant Mol Biol 14: 197-205), streptomycin (Maliga et al. 1988, Mol Gen Genet 214: 456-459), hygromycin B (Waldron et al. 1985, Plant Mol Biol 5: 103-108), bleomycin (Hille et al. 1986, Plant Mol Biol 7: 171-176), sulphonamides (Guerineau et al. 1990, Plant Mol Biol 15: 127-136), streptothricin (Jelenska et al. 2000, Plant Cell Rep 19: 298-303), or chloramphenicol (De Block et al. 1984, EMBO J 3: 1681-1689). Other selectable markers include genes that provide resistance or tolerance to herbicides, such as the S4 and/or Hra mutations of acetolactate synthase (ALS) that confer resistance to herbicides including sulfonylureas, imidazolinones, triazolopyrimidines, and pyrimidinyl thiobenzoates; 5-enol-pyrovyl-shikimate-3-phosphate-synthase (EPSPS) genes, including but not limited to those described in U.S. Pat. Nos. 4,940,935, 5,188,642, 5,633,435, 6,566,587, 7,674,598 (as well as all related applications) and the glyphosate N-acetyltransferase (GAT) which confers resistance to glyphosate (Castle et al. 2004, Science 304:1151-1154, and U.S. Patent Application Publication Nos. 20070004912, 20050246798, and 20050060767); BAR which confers resistance to glufosinate (see e.g., U.S. Pat. No. 5,561,236); aryloxy alkanoate dioxygenase or AAD-1, AAD-12, or AAD-13 which confer resistance to 2,4-D; genes such as *Pseudomonas* HPPD which confer HPPD resistance; Sprotophorphyrinogen oxidase (PPO) mutants and variants, which confer resistance to peroxidizing herbicides including fomesafen, acifluorfen-sodium, oxyfluorfen, lactofen, fluthiacet-methyl, saflufenacil, flumioxazin, flumiclorac-pentyl, carfentrazone-ethyl, sulfentrazone); and genes conferring resistance to dicamba, such as dicamba monoxygenase (Herman et al. 2005, J Biol Chem 280: 24759-24767 and U.S. Pat. No. 7,812,224 and related applications and patents). Other examples of selectable markers can be found in Sundar and Sakthivel (2008, J Plant Physiology 165: 1698-1716), herein incorporated by reference.

Other selection systems include using drugs, metabolite analogs, metabolic intermediates, and enzymes for positive selection or conditional positive selection of transgenic plants. Examples include, but are not limited to, a gene encoding phosphomannose isomerase (PMI) where mannose is the selection agent, or a gene encoding xylose isomerase where D-xylose is the selection agent (Haldrup et al. 1998, Plant Mol Biol 37: 287-96). Finally, other selection systems may use hormone-free medium as the selection agent. One non-limiting example the maize homeobox gene kn1, whose ectopic expression results in a 3-fold increase in transformation efficiency (Luo et al. 2006, Plant Cell Rep 25: 403-409). Examples of various selectable markers and genes encoding them are disclosed in Miki and McHugh (J Biotechnol, 2004, 107: 193-232; incorporated by reference).

In some embodiments of the disclosure, the selectable marker may be plant derived. An example of a selectable marker which can be plant derived includes, but is not limited to, 5-enolpyruvylshikimate-3-phosphate synthase (EPSPS). The enzyme 5-enolpyruvylshikimate-3-phosphate synthase (EPSPS) catalyzes an essential step in the shikimate pathway common to aromatic amino acid biosynthesis in plants. The herbicide glyphosate inhibits EPSPS, thereby killing the plant. Transgenic glyphosate-tolerant plants can be created by the introduction of a modified EPSPS transgene which is not affected by glyphosate (for example, U.S. Pat. No. 6,040,497; incorporated by reference). Other examples of a modified plant EPSPS which can be used as a selectable marker in the presence of glyphosate includes a P106L mutant of rice EPSPS (Zhou et al 2006, Plant Physiol 140: 184-195) and a P106S mutation in goosegrass EPSPS (Baerson et al 2002, Plant Physiol 129: 1265-1275). Other sources of EPSPS which are not plant derived and can be used to confer glyphosate tolerance include but are not limited to an EPSPS P101S mutant from *Salmonella typhimurium* (Comai et al 1985, Nature 317: 741-744) and a mutated version of CP4 EPSPS from *Agrobacterium* sp. Strain CP4 (Funke et al 2006, PNAS 103: 13010-13015). Although the plant EPSPS gene is nuclear, the mature enzyme is localized in the chloroplast (Mousdale and Coggins 1985, Planta 163:241-249). EPSPS is synthesized as a preprotein containing a transit peptide, and the precursor is then transported into the chloroplast stroma and proteolytically processed to yield the mature enzyme (della-Cioppa et al. 1986, PNAS 83: 6873-6877). Therefore, to create a transgenic plant which has tolerance to glyphosate, a suitably mutated version of EPSPS which correctly translocates to the chloroplast could be introduced. Such a transgenic plant then has a native, genomic EPSPS gene as well as the mutated EPSPS transgene. Glyphosate could then be used as a selection agent during the transformation and regeneration process, whereby only those plants or plant tissue that are successfully transformed with the mutated EPSPS transgene survive.

In some embodiments, the method further comprises permitting the dicot explant to recover after transformation. In some embodiments, the recovering step occurs prior to one or more selection steps. In some embodiments, the recovering step occurs after one or more selection steps. In some embodiments, the recovering step occurs both before and after one or more selection steps. In some embodiments, the recovering occurs for at least one day (e.g., at least 1, 2, 3, 4, 5, 6, 7 or more days) and in darkness. In some embodiments, the recovering occurs in a recovery medium, such as a medium described in the Examples, such one or more of the recovery media in any of Examples 1-9.

In some embodiments, after obtaining or selecting the transformed dicot explant, the method further comprises placing the selected or obtained transformed dicot explant onto growth medium. In some embodiments, the growth medium is a medium described in the Examples, such one or more of the growth media in any of Examples 1-9.

Hereinafter, the present invention will be described in detail by the following examples. However, the following examples are illustrative of the present invention, and the scope of the present invention is not limited by the following examples.

EXAMPLES

Example 1: Method of Transformation in Tomatoes

Below is an example method for transforming a dicot. The method is exemplified with tomatoes. The method was altered in certain examples as indicated in the relevant example.

(1) Sterilization of Seeds
a. Dry mature tomato seeds at least 14 days post pollination were soaked in 10% Clorox with 0.04% silwet-77 for 20 min. The seeds were then rinsed with sterilized water at least 3 times.

(2) Seeds Imbibition
a. The sterilized tomato seeds were transferred to Germination medium (Gamborg B5 medium with 20 g/L sucrose, 8 g/L agar, pH5.6), or a sterilized filter paper soaked with sterilized water. The seeds were then incubated at 25° C. in dark for 1 to 3 days (before the cotyledons emerged from the seed coat). One day of incubation was preferred.

(3) Inoculum Preparation
The *Agrobacterium* strain EHA101 containing a vector of interest stored at −80° C. was streaked on solid LB (Lennox) agar (Caisson Laboratories, Cat No. LBP04) with appropriate antibiotics at least 3 days before inoculation, and re-streaked once on a new solid LB (Lennox) medium 1 day before inoculation. The *Agrobacterium* were collected and re-suspended in liquid infection medium (MS medium with 0.5 mg/L BAP, 20 g/L sucrose, 10 g/L glucose, 4 g/L MES, pH5.5) with 400 μM Acetosyringone (AS) and 1 mM Dithiothreitol (DTT). The *Agrobacterium* suspension was adjusted OD660 to 0.5.

(4) Explants Preparation and Infection
There were two ways used to prepare the explants:
a. The imbibed seeds were cut into small pieces with a scalpel to be used as explants for transformation. The seed coat was removed either before or after the cutting. The size of the explants was generally between 0.1 mm to 2 mm, with about 0.5 mm being preferred. The explants were immersed into *Agrobacterium* suspension for inoculation for about 2 hours, but it is also expected that between 5 minutes to 6 hours inoculation will be sufficient. OR
b. The imbibed seeds were cut into small pieces to be used as explants using a blender (BAMIX® GASTRO 350). The container and knife of the blender were sterilized with 75% alcohol. The imbibed seeds and some water were placed in the container. The seed coat was optionally removed before blending. The imbibed seeds were cut using the blender at the speed of 18,000 rpm. The explants with appropriate size were isolated with a sieve. The explants were immersed into *Agrobacterium* suspension for inoculation for about 2 hours, but it is also expected that between 5 minutes to 6 hours inoculation will be sufficient.

(5) Co-Culture
a. After inoculation, the *Agrobacterium* suspension was removed from the explants with a dropper or pipette. The explants were transferred to a co-culture medium plate (½ MS medium with 0.5 mg/L BAP, 20 g/L sucrose, 10 g/L glucose, 4 g/L MES, 200 μM, 1 mg/L Silver Nitrate, 7 g/L Agar, pH 5.4) with a piece of filter paper on top of the medium, or a filter paper soaked with liquid co-culture medium (¼ MS medium with 0.25 mg/L BAP, 10 g/L sucrose, 5 g/L glucose, 2 g/L MES, 100 μM Acetosyringone, 0.5 mg/L Silver Nitrate, pH 5.4). The explants were dispersed evenly on the medium. The plate was sealed with parafilm and incubated at 22° C. in the dark for 2-3 days.

(6) Recovery a. The explants were transferred to recovery medium (MS medium with 20 g/L sucrose, 10 g/L glucose, 1 mg/L Zeatin, 0.01 mg/L IAA, 150 mg/L Timentin, 150 mg/L Carbenicillin, 10 g/L Agar, pH 5.8). The explants were cultured at 25° C. in the dark for 4 days.

(7) Selection 1 a. The explants were transferred to selection medium 1 (MS medium with 1× B5 vitamins, 30 g/L sucrose, 1 mg/L Zeatin, 0.01 mg/L IAA, 150 mg/L Timentin, 150 mg/L Carbenicillin, 10 g/L Agar, pH 5.8, with selection agent corresponding to the selectable marker, for example, spectinomycin 100 mg/L or glyphosate). The explants were cultured at 25° C. 16 hours/8 hours (light/dark) for 3 weeks.

(8) Selection 2 a. Explants with green buds were transferred to selection medium 2 (MS medium with 1× B5 vitamins, 30 g/L sucrose, 0.2 mg/L Zeatin, 150 mg/L Timentin, 150 mg/L Carbenicillin, 10 g/L Agar, pH 5.8, with selection agent corresponding to the selectable marker, for example 100 mg/L spectinomycin or glyphosate). The explants were kept at 25° C. 16 hours/8 hours (light/dark). The explants were sub-cultured to new selection medium 2 every 3 weeks, and continue sub-culture if needed (9) Rooting a. The selected green shoots were transferred to rooting medium (MS medium with 0.1 g/L Inositol, 1 mg/L thiamine, 0.5 mg/L pyridoxine, 0.5 mg/L nicotinic acid, 1 mg/L glycine, 10 g/L sucrose, 150 mg/L Timentin, 150 mg/L Carbenicillin, 8 g/L Agar, pH 5.8). The shoots were kept at 24-25° C. 16 hours/8 hours (light/dark) to promote rooting.

The vectors used in the below examples are as follows:

| Vector ID | Selectable marker | Selection agent and pressure |
|---|---|---|
| 19741 | EPSPS | Glyphosate 15 μM |
| 22810 | PAT | Glufosinate 2 mg/L |
| 24133 | aadA | Spectinomycin 100 mg/L |
| 24134 | NPT II | Kanamycin 100 mg/L |
| 24416 | aadA | Spectinomycin 100 mg/L |

The following protocol describes the collection and analysis of the plant material for the below examples:

Plant Leaf Material and Genomic DNA Extraction

Two leaf discs per plant were collected and placed into a 96-well block. Genomic DNA was extracted following the Magbeads Plant genome extraction protocol from Promega.

TAQMAN® Assays Design and qPCR

TAQMAN® assay was designed using Primer Express 3.0 (Life Technologies, Inc.) to the coding sequence of the selectable marker present in the vector to detect the presence of vector sequence in the extracted genomic DNA. The amplicon was blasted with the tomato genome database to ensure assay specificity. Primers and probes were purchased from Life Technologies.

Each 25 μl qPCR reaction contained 12.5 μl 2× Sigma JumpStart Master Mix (Sigma-Aldrich Corporation, P2893), 5 μl DNA, 0.5 μl TAQMAN® assay (final concentration: 300 nM for primers and 100 nM for probe) and 6.5 μl water. qPCR was performed in an ABI 7900HT real-time PCR system under conditions: 95° C. for 5 min; 40 cycles of 95° C. for 5 sec followed by 60° C. for 30 sec.

Data Analysis

Data were analyzed using the SDS 2.4 software. The Cycle threshold values (Ct) were generated by selecting a threshold line that was placed in the region of exponential amplification across all of the amplification plots, and clearly above the background fluorescence and above the level where splitting or fork effects between replicates can be observed. The baseline was set at a cycle number three to five cycles earlier than the cycle number at which the threshold line crosses the first amplification curve (e.g. earliest Ct=24, set the baseline crossing at Ct=24−3=21).

Example 2: Transformation of Explants from 1-Day Imbibed Seeds and 7-Day Imbibed Seedlings from Tomatoes Variety used: Moneymaker
Vector used: 24416

The procedure of transformation of explants from 1-day imbibed seeds at least 14 days post pollination was as described in Example 1.

The procedure of transformation of explants from 7-day seedlings:

1. Sterilization of seed: as described in Example 1.
2. Seeds imbibition: The sterilized seeds were transferred to a growth container with appropriate amount of germination medium (0.5×MS medium with 10 g/L sucrose, 10 g/L Phytagel, pH5.8). The seeds were kept at 25° C. 16 hours/8 hours (light/dark), for 7 days.
3. *Agrobacterium*: *Agrobacterium* suspension were prepared as described in Example 1.
4. Explants preparation and infection: The hypocotyl and cotyledon were cut into segments of about 5 mm in length. The segments were inoculated in *Agrobacterium* suspension for about 5 minutes.
5. Co-culture: as described in Example 1.
6. Recovery: as described in Example 1.
7. Selection 1: as described in Example 1.
8. Selection 2: as described in Example 1.
9. Rooting: as described in Example 1.

The results from the transformation are shown in the below tables. The Transformation Frequency (TF) is equal to the number of confirmed positive plants divided by the total explants initiated for transformation, which is multiplied by 100 to obtain the percentage.

TABLE 1

| | Transformation Efficiency | | | | |
|---|---|---|---|---|---|
| Explant type | Source of explant | No. Explants | No. Regenerate shoots | No. TaqMan aadA Positive events | Transformation Frequency (TF) |
| Hypocotyl | 7-day imbibed seedlings | 131 | 26 | 23 | 17.56% |
| Cotyledon | 7-day imbibed seedlings | 121 | 1 | 1 | 0.83% |

TABLE 1-continued

Transformation Efficiency

| Explant type | Source of explant | No. Explants | No. Regenerate shoots | No. TaqMan aadA Positive events | Transformation Frequency (TF) |
|---|---|---|---|---|---|
| Hypocotyl | 1-day imbibed seeds | 58 | 2 | 2 | 3.45% |
| Cotyledon | 1-day imbibed seeds | 102 | 12 | 12 | 11.76% |

TABLE 2

Large % of abnormal ploidy plants recovery from 7 day seedlings explants

| Source of explants | No. of plants for ploidy assay | No. of plants with normal ploidy (2n) | expected ploidy rate |
|---|---|---|---|
| 1-day imbibed seeds | 11 | 11 | 100% |
| 7-day imbibed seedlings | 11 | 3 | 27.3% |

TABLE 3

Comparison between explants from 1-day imbibed seeds in water and on solid germination medium

| Explants | Germ Medium | No. Explants number | No. Regenerate shoots | No. TaqMan Positive events | TF |
|---|---|---|---|---|---|
| Hypocotyl | medium | 58 | 2 | 2 | 3.45% |
| Cotyledon | medium | 102 | 12 | 12 | 11.76% |
| Hypocotyl | Water | 70 | 0 | 0 | 0.00% |
| Cotyledon | Water | 68 | 6 | 6 | 8.82% |

Example 3: Transformation of Different Explant Types

Variety used: Syngenta Variety 1
Vector used: 24133
Source of explant: 1-day imbibed tomato seeds at least 14 days post pollination
The process of transformation was performed as described in Example 1.

TABLE 4

Results

| Explant type | No. Explants | No. Regenerate shoots | No. TaqMan aadA Positive events | TF |
|---|---|---|---|---|
| Apical meristem | 15 | 1 | 1 | 6.7% |
| Cotyledonary node | 36 | 2 | 2 | 5.6% |

TABLE 4-continued

Results

| Explant type | No. Explants | No. Regenerate shoots | No. TaqMan aadA Positive events | TF |
|---|---|---|---|---|
| Hypocotyl | 37 | 2 | 2 | 5.4% |
| Cotyledon | 108 | 5 | 5 | 4.6% |

Example 4: Transformation of Explants from Different Sources

Variety used: Syngenta Variety 1
Vector used: 24133
The process of transformation was performed as described in Example 1.

TABLE 5

Results

| Explant types | Source of explant | No. Explants | No. Regenerate shoots | No. TaqMan aadA Positive events | TF |
|---|---|---|---|---|---|
| Cotyledon | 1-day imbibed tomato seeds | 108 | 5 | 5 | 4.6% |
| Cotyledon | 3-day imbibed tomato seeds | 82 | 3 | 3 | 3.7% |

Example 5: Transformation Using Different Selection Agents

Source of explant: 1-day imbibed tomato seeds at least 14 days post pollination
The process of transformation was performed as described in Example 1.

TABLE 6

Results

| Variety | Vector ID | Selective marker | Explant type | No. Explants | No. Regenerate shoots | No. selective marker Positive events | TF |
|---|---|---|---|---|---|---|---|
| Syngenta Variety 1 | 19741 | EPSPS | Cotyledon | 90 | 2 | 2 | 2.2% |
| Syngenta Variety 2 | 22810 | PAT | Cotyledon | 66 | 22 | 4 | 6.1% |
| Moneymaker | 24134 | NPT II | Mix | 60 | 1 | 1 | 1.7% |

Example 6: Transformation of Multiple Varieties Having Diverse Genetic Backgrounds Vector used: 24133

Source of explant: 1-day imbibed tomato seeds at least 14 days post pollination

The process of transformation was performed as described in Example 1. The results in Table 7 show that the transformation method works in several varieties with diverse genetic backgrounds.

TABLE 7

Results

| Syngenta variety name or public name | No. of Explants | No. of Positive events | TF | No. of plants sent to ploidy assay | No. of plants with normal ploidy level (2n) | Rate of plants with expected ploidy level |
| --- | --- | --- | --- | --- | --- | --- |
| Syngenta Variety 3 | 124 | 5 | 4.03% | 0 | n/a | n/a |
| Syngenta Variety 4 | 91 | 7 | 7.69% | 8 | 8 | 100.00% |
| Syngenta Variety 5 | 111 | 5 | 4.50% | 0 | n/a | n/a |
| Syngenta Variety 6 | 214 | 22 | 10.28% | 12 | 12 | 100.00% |
| Syngenta Variety 7 | 146 | 10 | 6.85% | 0 | n/a | n/a |
| Syngenta Variety 1 | 117 | 4 | 3.42% | 0 | n/a | n/a |
| Syngenta Variety 2 | 117 | 8 | 6.84% | 0 | n/a | n/a |
| Syngenta Variety 8 | 107 | 11 | 10.28% | 8 | 8 | 100.00% |
| Syngenta Variety 9 | 124 | 9 | 7.26% | 0 | n/a | n/a |
| Syngenta Variety 10 | 324 | 46 | 14.20% | 35 | 30 | 85.71% |
| Syngenta Variety 11 | 111 | 10 | 9.01% | 0 | n/a | n/a |
| Syngenta Variety 12 | 119 | 6 | 5.04% | 0 | n/a | n/a |
| Syngenta Variety 13 | 128 | 18 | 14.06% | 7 | 6 | 85.71% |
| Syngenta Variety 14 | 63 | 9 | 14.29% | 0 | n/a | n/a |
| Syngenta Variety 15 | 146 | 9 | 6.16% | 0 | n/a | n/a |
| Syngenta Variety 16 | 313 | 7 | 2.24% | 0 | n/a | n/a |
| Syngenta Variety 17 | 190 | 11 | 5.79% | 0 | n/a | n/a |
| Alisacraig | 104 | 16 | 15.38% | 13 | 12 | 92.31% |
| Moneymaker | 67 | 18 | 26.87% | 13 | 13 | 100.00% |

Example 7: Watermelon Transformation with 1-Day Imbibed Seeds

Source of explant: 1-day imbibed watermelon seeds at least 14 days post pollination Below is an example transformation process which was used for watermelon.

1. Sterilization of seeds: Removed the seed coat. Sterilized with 15% Clorox+0.1% ul of Tween 20 for 15 min, then washed with sterilized water for >3 times.
2. Seeds imbibition: as described in Example 1 for 1 day.
3. *Agrobacterium*: as described in Example 1.
4. Explants preparation and infection: As described in Example 1 except as follows. Separated the embryo axis and cotyledon. The cotyledon was inoculated in *Agrobacterium* suspension (OD=0.5) for at least 2 hours.
5. Co-culture: As described in Example 1 except as follows. After inoculation, transferred the explants to co-culture medium, and sealed the petri dish with parafilm. The co-culture medium was an empty petri dish with a filter paper, and added 1 ml liquid coculture medium. Kept at 22° C. in the dark for 3 days.
6. Recovery: After co-culture, transferred the explants to recovery medium (MS medium with 1× B5 vitamins, 1× MS lion, 20 g/L sucrose, 10 g/L glucose, 0.01 mg/L IAA, 2 mg/L Zeatin, 1 mg/L BAP, 150 mg/L Timentin, 150 mg/L Carbenicillin, 10 g/L Agar, pH=5.8). Kept at 25° C. in dark for 4 days
7. Selection 1: After Recovery, transferred to selection medium (MS medium with 1× B5 vitamins, 1×Ms Iron, 20 g/L sucrose, 10 g/L glucose, 0.01 mg/L IAA, 2 mg/L Zeatin, 1 mg/L BAP, 150 mg/L Timentin, 150 mg/L Carbenicillin, 150 mg/L Spectinomycin, 10 g/L Agar, pH=5.8). Kept at 25° C. in 16 hours/8 hours (light/dark) for about 14 days. Then subcultured to new selection medium and kept at 25° C. in 16 hours/8 hours (light/dark) for about 21 days.
8. Selection 2: After Selection 1, transferred to selection medium (MS medium with 1× B5 vitamins, 1× Ms Iron, 30 g/L sucrose, 0.2 mg/L kinetin, 150 mg/L Timentin, 150 mg/L Carbenicillin, 150 mg/L Spectinomycin, 10 g/L Agar, pH=5.8) and kept at 25° C. in 16 hours/8 hours light/dark for about 14 days.
9. Rooting: transferred the regenerated shoots to new rooting medium (MS basal salts and vitamins, plus 1× B5 vitamins, plus 1× Ms Iron, 30 g/L sucrose, 0.2 mg/L kinetin, 0.2 mg/L NAA, 150 mg/L Timentin, 150 mg/L Carbenicillin, 150 mg/L Spectinomycin, 10 g/L Agar, pH=5.8) in pot for rooting.

TABLE 8

| Explant type | No. of Explants | No. Regenerate shoots | No. of Positive events | Transformation frequency (TF) | Variety | Vector |
|---|---|---|---|---|---|---|
| Cotyledonary node | 20 | 14 | 14 | 70.00% | 97103 | 24133 |

Example 7: Biolistic Transformation of Tomato

Variety used: Ailsa Craig

Vector used: linearized fragment contains selectable marker and reporter GUS cassette from 24133

Source of explant: 1-day imbibed seeds

Below is an example biolistic transformation for tomato.

1. Sterilization of seeds: as described in Example 1.

2. Seeds imbibition: as described in Example 1, in germination medium

3. Explants preparation: Split the seeds and isolated the halved embryo. Cut the embryo into pieces to be used as explants. Transferred the explants to Osmotic medium (MS medium with 1× Ms Iron, 30 g/L sucrose, 60 g/L Mannitol, 10 g/L Agar, pH=5.8). Each Osmotic medium plate contains explants from 20 seeds. Rearranged the explants to the center of the Osmotic medium plate, and do not overlap them. Kept the explants at 25° C. in the dark for 4-8 hours.

4. Gold particle preparation: the method of coating DNA to gold particle followed by Sanford et al (1992). Two mg 0.6 μm gold particle was washed by 1 ml absolute ethanol by sonication and replaced by ddH2O and sonication again in a test tube. After pellet the goal and completely remove the water, the gold was suspended in 50 μl H2O. 0.6 pMol DNA, 250 μl CaCl2 (2.5 M) and 50 μl Spermidine (0.1 M) was added into the gold suspension and adjust the volume with water to final 500 μl. Mixed gently and keep on ice for >30 min. Pellet the gold by centrifugation and remove the supernatant, wash the DNA coated gold twice with 1 ml ethanol. The gold was resuspended in 60 μl ethanol. Resuspended the gold particle, and transferred the suspension to micro carrier for biolistic transformation 5. Biolistic: The type of biolistic particle delivery system used: BIO-RAD, PDS-1000. The distance between Stop screen and explants was set to 6 cm, pressure set to 1100 psi, vacuum set to 28 inches Hg. One shot for each plate.

6. After biolistic: The explants were kept on Osmotic medium overnight. Then washed in 1 ml liquid ¼ MS medium (¼ MS medium with 1 mg/L Zeatin, 10 g/L sucrose, 5 g/L glucose, 2 g/L MES, 20 mg/L Acetosyringone, 0.5 mg/L Silver Nitrate). Transfer the explants to recovery medium (MS medium with 1× Ms Iron, 20 g/L sucrose, 10 g/L glucose, 10 g/L Polyvinyl Pyrrolidone, 1 mg/L Zeatin, 0.01 mg/L IAA, 150 mg/L Timentin, 150 mg/L Carbenicillin, 10 g/L Agar). Kept the explants at 25° C. in dark for 4 days 7. Selection 1: as described in Example 1.

8. Selection 2: as described in Example 1.

9. Rooting: as described in Example 1.

TABLE 9

| Imbibed days of explants | Seeds | Estimated Explants number | No. Regenerate shoots | No. of Positive events | Estimated TF |
|---|---|---|---|---|---|
| 1 | 20 | 200 | 1 | 1 | 0.50% |

Example 8: Mechanically Prepared Explants for Transformation

Variety used: Ailsa Craig
Explant type: mixed
Vector used: 24416

The process of transformation was as described in Example 1 except for the explant preparation method, which is described below.

TABLE 10

| Seeds | Explants number | Cut method | Explants per seeds | No. of Positive events | TF |
|---|---|---|---|---|---|
| 20 | 139 | First cut with scalpel to split the seeds, then immerge the halved embryo in water and blender at low speed (18000 rpm) for about 3 seconds, collect large pieces of explants and blender again until all explants could pass through the sieve. Count the alive explants when transfer from recovery to Selection 1 | 6.95 | 12 | 8.6% |
| 10 | 165 | First cut with scalpel to split the seeds, then cut perpendicularly, inoculate the cut seeds, then remove the seed coat | 16.5 | 20 | 12.1% |
| 10 | 170 | Cut the seeds into slices with scalpel, inoculate the | 17 | 20 | 11.8% |

TABLE 10-continued

| | | Cut method and results | | | |
|---|---|---|---|---|---|
| Seeds | Explants number | Cut method | Explants per seeds | No. of Positive events | TF |
| | | cut seeds, then remove the seed coat | | | |

Example 9: Use of Fresh Seeds Harvested from Mature Tomato Fruits as Source of Explants Variety: Syngenta Variety 1
Explant type: mixed
Vector used: 24133
A process of transformation of explants from fresh seeds is described:

1. Ripened fruits were harvested from plants grown in a greenhouse.
2. The surface of ripened fruits were sterilized with high-temperature metal tools. Specifically, a spoon was placed into dry sterilizer (250° C.). After 1-2 minutes, the hot spoon was pressed on the surface of the tomato fruit. This was repeated several times.
3. The sterilized surface was cut and fresh seeds were retrieved with a spoon.
4. The fresh seeds were cut into small explants, and the seed coat was removed for inoculation.
5. Inoculated the explants in *Agrobacterium* suspension for 0.5-1 hour, and completely remove the *Agrobacterium* suspension.
6. Added a sterilized filter paper to solid co-culture plate, and transferred the explants to the plate and co-cultured on the filter paper at 22° C. in dark for 2 days.
7. The other steps are the same as described in Example 1.

TABLE 11

| | | Results | | |
|---|---|---|---|---|
| Explant source | No. of Explants | No. Regenerate shoots | No. of Positive events | TF |
| Fresh Seeds | 165 | 9 | 9 | 5.45% |

REFERENCES

U.S. Pat. No. 5,422,259A
U.S. Pat. No. 5,986,181A
WO0113707A1
US2002157139 A1
Ellul, P., Garcia-Sogo, B., Pineda, B., Rios, G., Roig, L. A. and Moreno, V. (2003) The ploidy level of transgenic plants in *Agrobacterium*-mediated transformation of tomato cotyledons (*Lycopersicon esculentum* Mill.) is genotype and procedure dependent [corrected]. Theor Appl Genet, 106, 231-238.
Sigareva, M., Spivey, R., Willits, M. G., Kramer, C. M. and Chang, Y. F. (2004) An efficient mannose selection protocol for tomato that has no adverse effect on the ploidy level of transgenic plants. Plant Cell Rep, 23, 236-245.

What is claimed is:

1. A method of transforming a tomato plant cell, comprising:
   (a) obtaining a tomato plant seed;
   (b) soaking the tomato plant seed in a seed-soak medium;
   (c) dividing the soaked tomato plant seed of step (b) into at least 10 tomato explants;
   (d) inoculating the at least 10 tomato explants of step (c) with *Agrobacterium* comprising a nucleic acid of interest, thereby obtaining *Agrobacterium*-inoculated tomato explants; and
   (e) co-cultivating the *Agrobacterium*-inoculated tomato explants to produce a transformed tomato plant cell, wherein the soaking step of step (b) is within the range of 1 hour to 72 hours, with or without light, wherein the method produces less than 15% aberrant tetraploid transformants, wherein the plurality of tomato explants is at least 10 discrete explants.

2. The method of claim 1 wherein the tomato plant seed is a mature seed, optionally a dry mature seed.

3. The method of claim 1 wherein the tomato plant seed is a fresh seed harvested from fruit or a seed harvested from a dried fruit, optionally a fresh maturing seed harvested from fresh fruit or a vigorous maturing seed harvested from a dried fruit.

4. The method of claim 1, wherein the co-cultivation of step (e) occurs in darkness over a multi-day period.

5. The method of claim 4, wherein the multi-day period is 2 to 5 days, at a temperature of approximately 22° C.

6. The method of claim 1 further comprising:
   (f) removing the tomato explants from the co-culture of step (e) or the delivery of step (d) and allowing said explants to recover; and
   (g) incubating the recovered tomato explants from step (f) on at least one selection medium, wherein the at least one selection medium permits survival of transformed tomato explants.

7. The method of claim 6, wherein the recovering step of step (f) occurs in darkness over an at least one day period in a recovery medium at 25° C., optionally wherein the recovery medium comprises Murashige and Skoog salts and vitamins, 0.01 mg/L Indole Acetic Acid, 1 mg/L Zeatin, 150 mg/L timentin, and 150 mg/L carbenicillin.

8. The method of claim 6, further comprising placing the selected transformed tomato explants of step (g) onto growth medium.

9. The method of claim 7, wherein the at least one day period is one to seven days.

10. The method of claim 1 wherein the suitable seed-soak medium comprises a medium selected from the group consisting of water, B5, Woody, and MS.

11. The method of claim 1, wherein a seed coat of the tomato plant seed is removed or damaged before the inoculation or delivery of step (d).

12. The method of claim 11, wherein the seed coat is removed or damaged by a manual means or a mechanical means.

13. The method of claim 8, further comprising growing the selected transformed tomato explants into seedlings, and optionally sampling said seedlings for molecular analysis.

14. The method of claim 1, wherein the dividing in step (c) comprises cutting or crushing the soaked dicot plant seed of step (b).

15. The method of claim 6, wherein the selection medium is a non-metabolizable sugar.

16. The method of claim 15, wherein the non-metabolizable sugar is selected from the group consisting of mannose-6-phosphate, palatinose, and turanose.

* * * * *